(12) United States Patent
Bungert et al.

(10) Patent No.: US 12,002,057 B2
(45) Date of Patent: *Jun. 4, 2024

(54) PREDICTIVE CONTEXTUAL TRANSACTION SCORING

(71) Applicant: METROPOLITAN LIFE ISURANCE CO., New York, NY (US)

(72) Inventors: John Bungert, Durham, NC (US); Terrance Luciani, Monroe Township, NJ (US); Andrew O'Mara, New York, NY (US); Jordan Ashleigh McAlister, Cary, NC (US)

(73) Assignee: METROPOLITAN LIFE ISURANCE CO., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,348

(22) Filed: Apr. 28, 2023

(65) Prior Publication Data
US 2023/0267473 A1 Aug. 24, 2023

Related U.S. Application Data

(63) Continuation of application No. 17/200,067, filed on Mar. 12, 2021, now Pat. No. 11,676,154.

(51) Int. Cl.
*G06Q 20/40* (2012.01)
(52) U.S. Cl.
CPC ..... *G06Q 20/4097* (2013.01); *G06Q 20/4014* (2013.01); *G06Q 20/4016* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 9,727,616 B2* | 8/2017 | Wu | G06F 16/24578 |
| 2009/0276368 A1* | 11/2009 | Martin | G06Q 40/02 |
| | | | 705/36 R |
| 2013/0151388 A1* | 6/2013 | Falkenborg | G06Q 40/02 |
| | | | 705/35 |
| 2014/0222506 A1* | 8/2014 | Frazer | G06Q 30/02 |
| | | | 705/7.29 |

* cited by examiner

*Primary Examiner* — Bruce I Ebersman
*Assistant Examiner* — Matthew Cobb
(74) *Attorney, Agent, or Firm* — Polsinelli

(57) ABSTRACT

In one embodiment, a predictive contextual transaction scoring system receives transaction review data associated with person-to-person transactions from a marketplace, the transaction review data including feedback information relating to the person-to-person transaction. The system identifies contextual characteristics of the person-to-person transactions by analyzing the feedback information related to the person-to-person transactions. The system pairs a first party requesting a service to a second party providing the requested service by matching a contextual characteristic of the first party to a contextual characteristic of the second party. The system also predicts a transaction score for a new person-to-person transaction involving the first party and the second party, and provides the predicted transaction score to the marketplace to facilitate pairing of the first party requesting the service.

14 Claims, 6 Drawing Sheets

350

| PARTY 352A | |
|---|---|
| CONTEXTUAL CHARACTERISTICS 355 | PRIORITY 430 |
| SAFETY 421 | 1 |
| CLEANLINESS 422 | 2 |
| TIMELINESS 423 | 3 |
| RIDER 354 | |
| RIDESHARE 356 | |
| RIDESHARE PLATFORM 358 | |

| PARTY 352B | |
|---|---|
| CONTEXTUAL CHARACTERISTICS 355 | PRIORITY 430 |
| SPEEDER 424 | 1 |
| CLEANLINESS 422 | 2 |
| FRIENDLY 425 | 3 |
| DRIVER 354 | |
| RIDESHARE 356 | |
| RIDESHARE PLATFORM 358 | |

| PARTY 352C | |
|---|---|
| CONTEXTUAL CHARACTERISTICS 355 | PRIORITY 430 |
| FRIENDLY 425 | 1 |
| CLEANLINESS 422 | 2 |
| HOST 354 | |
| SHORT-TERM RENTAL 356 | |
| RENTAL PLATFORM 358 | |

| PARTY 352D | |
|---|---|
| CONTEXTUAL CHARACTERISTICS 355 | PRIORITY 430 |
| SAFETY 421 | 1 |
| INEXPERIENCED 426 | 2 |
| DRIVER 354 | |
| RIDESHARE 356 | |
| RIDESHARE PLATFORM 358 | |

*Fig. 4*

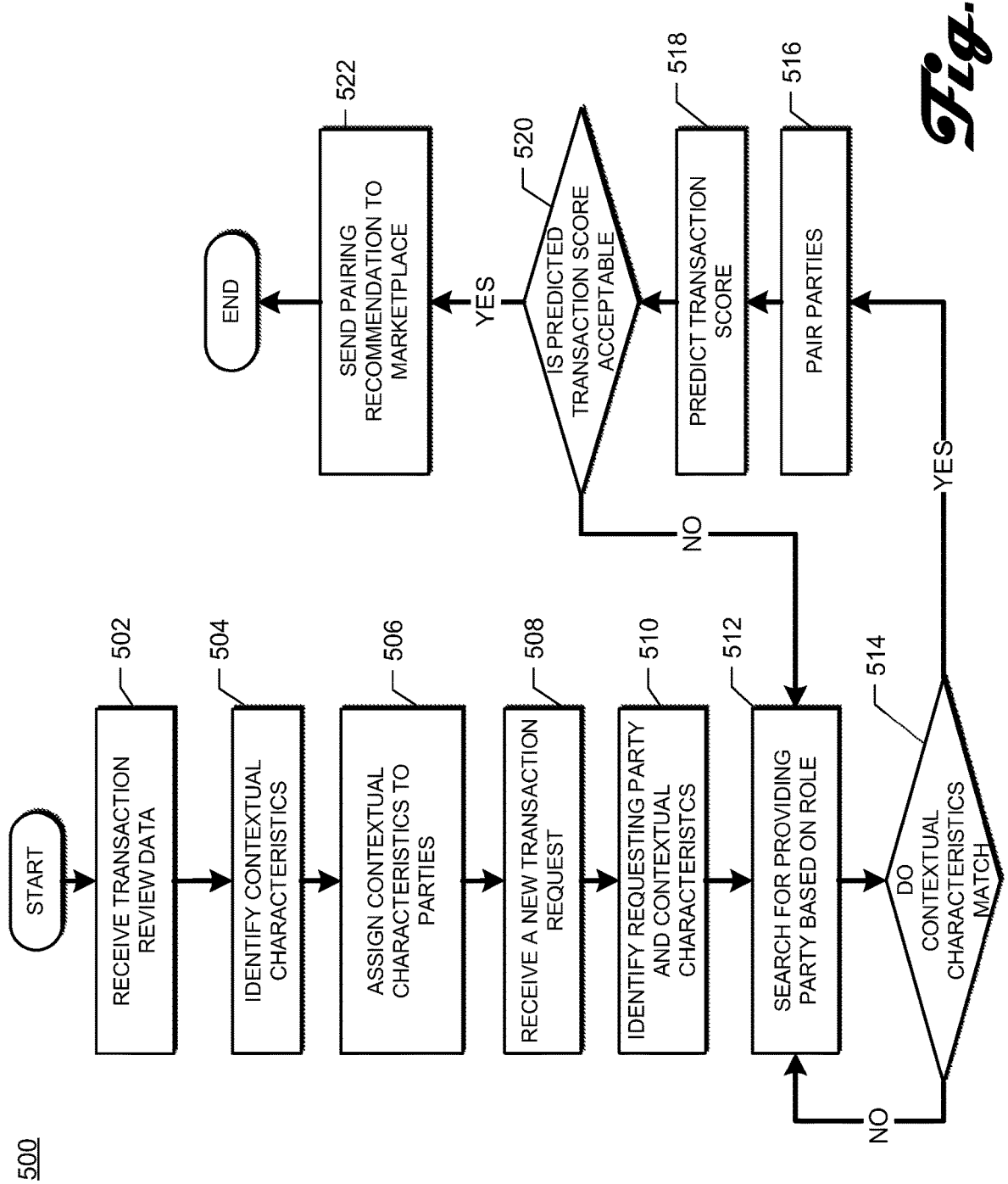

PREDICTIVE CONTEXTUAL TRANSACTION SCORING

CROSS-REFERENCE TO RELATED APPLICATION

The present application is a continuation of, and claims priority to, U.S. Non-Provisional patent application Ser. No. 17/200,067, entitled "PREDICTIVE CONTEXTUAL TRANSACTION SCORING," filed Mar. 12, 2021, which published as US 2022/0292513 on Sep. 15, 2022, the disclosure of which is incorporated herein by reference.

TECHNICAL FIELD

The present disclosure relates generally to data processing systems, and more particularly, to prediction of a person-to-person transaction score based on identification of contextual characteristics and contextual preferences derived from prior transaction review data.

BACKGROUND

Internet marketplaces and platforms that rely on user collaboration typically implement a review system to solicit feedback associated with transactions or interactions occurring within such marketplaces or platforms. For marketplaces and platforms that facilitate person-to-person transactions—such as lodging, transportation, shipping, housework, or other goods and services—it is desired that the transacting parties each experience a positive, pleasant and successful transaction. Often, however, due to the nature of person-to-person transactions, the parties may part ways unsatisfied due to a number of issues regarding the transaction. For example, a customer who places a high priority on a clean vehicle for a rideshare service, may be unsatisfied with a rideshare transaction where a vehicle may be dirty but otherwise arrives at their intended destination in a timely and safe manner. Unsatisfied parties to a transaction may then leave negative feedback or reviews, and may even stop using a marketplace or platform altogether. Existing marketplaces and platforms may implement certain matching algorithms to match a customer to a provider based on, for example, a location of a provider, distance from a provider to a customer, or other non-contextual parameters, but lack consideration of context-related parameters that may contribute to a positive outcome of a person-to-person transaction.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates exemplary data mapping of the contextual characteristics data;

FIG. 5 illustrates an example process diagram for predicting a contextual transaction score.

DESCRIPTION OF EXAMPLE EMBODIMENTS

Overview

According to one or more embodiments of the disclosure, a predictive contextual transaction scoring system receives transaction review data associated with person-to-person transactions from a marketplace. The system further identifies contextual characteristics of the person-to-person transactions by analyzing the feedback information related to the person-to-person transactions. The system also pairs a first party requesting a service to a second party providing the requested service by matching a contextual characteristic of the first party to a contextual characteristic of the second party. The system further predicts a transaction score for a new person-to-person transaction involving the first party and the second party, the predicted transaction score representing predicted feedback for the new person-to-person transaction and generated based on the matched contextual characteristic of the first party to the second party. The system provides the predicted transaction score to the marketplace to facilitate pairing of the first party requesting the service. These and other features will be discussed herein with respect to various exemplary embodiments of the disclosed predictive contextual transaction scoring system.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A predictive contextual transaction scoring environment typically includes a communication network, which is a geographically distributed collection of devices or nodes interconnected by communication links and segments for transporting data there-between. The devices may include, for example, electronic devices such as personal computers, laptops, tablets, mobile phones, servers, data centers, and the like. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
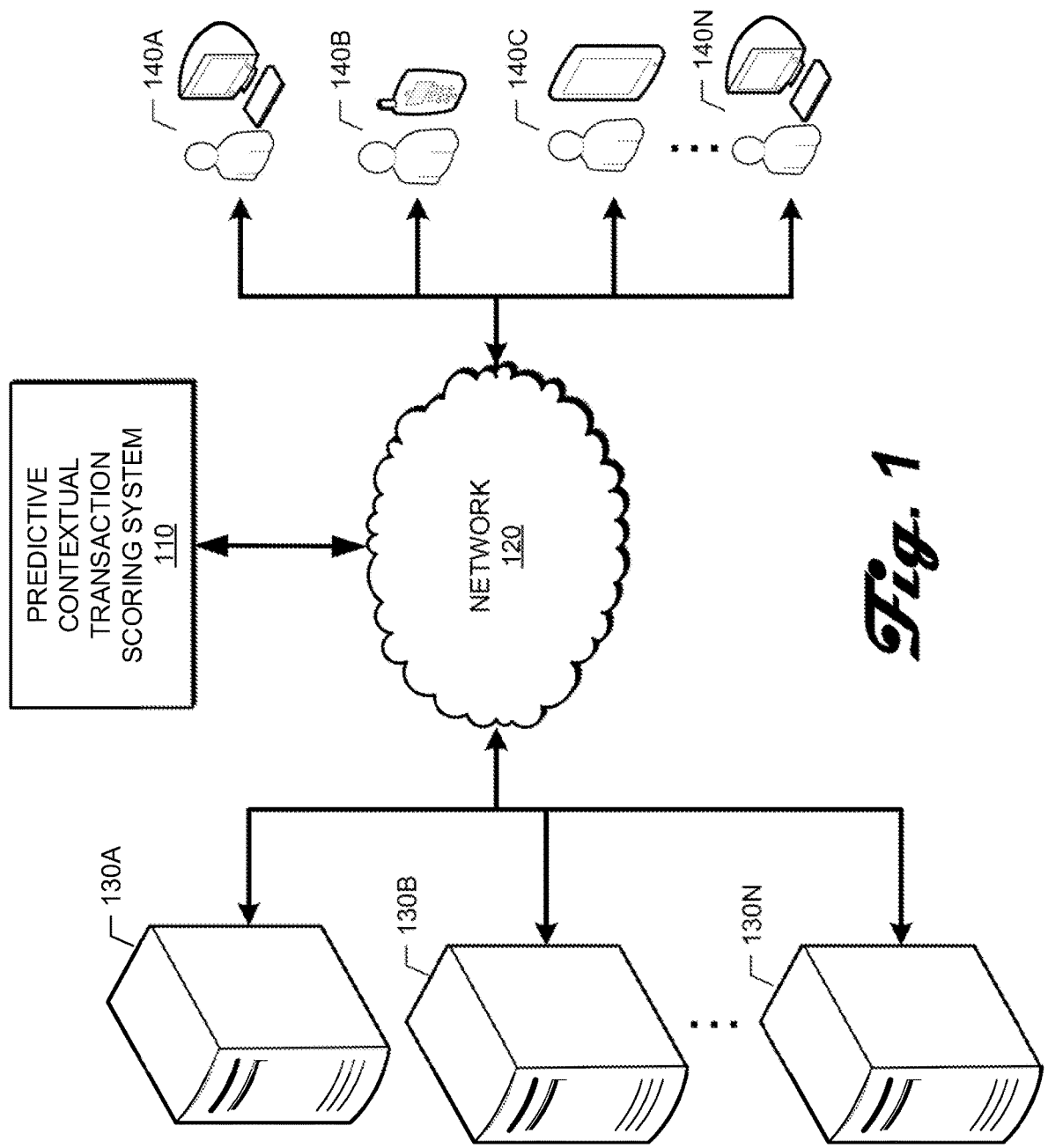
FIG. 1 illustrates a schematic diagram of an example network environment utilizing a predictive contextual transaction scoring system.

Referring to the figures, FIG. 1 illustrates a schematic diagram of an example network environment 100 utilizing a predictive contextual transaction scoring system 110. Communication network 120 is shown for purposes of illustration and represents various types of networks, including local area networks (LANs), wide area networks (WANs), telecommunication networks (e.g., 4G, 5G, etc.), satellite networks, broadband networks (BBN), and/or a network of networks, such as the Internet, etc. Further, the communication network 120 can include, but is not limited to, any one or more of the following network topologies, including a bus network, a star network, a ring network, a mesh network, a star-bus network, tree or hierarchical network, and the like.

The predictive contextual transaction scoring system 110 is connected via the communication network 120 to a plurality of marketplaces 130A-N (collectively marketplaces 130) that facilitate person-to-person transactions, such as for example, ride sharing platforms, short-term rental platforms, secondary market platforms, etc. Client devices 140A-N (collectively client devices 140) may access the marketplaces 130 directly via the communication network 120. As shown, client devices 140 include a computer 140A, a mobile device 140B, and a tablet 140C. The illustrated client devices 140 show specific electronic devices, but it is appreciated that client devices 140 in the broader sense are not limited to such specific electronic devices. For example, client devices 140 can include any number of electronic devices such as laptops, smart watches, wearable smart devices, smart glasses, vehicle systems, other smart wearables, and so on.

The marketplaces 130 and client devices 140 are interconnected by communication links and/or network segments and exchange or transport data such as data packets to/from the predictive contextual transaction scoring system 110. In addition, those skilled in the art will understand that any number of devices and links may be used in communication network 120, and that the views shown by FIG. 1 is for simplicity and discussion.

Data packets sent from marketplaces 130 and/or client devices 140 represent network traffic or messages, which are exchanged between marketplaces 130, client devices 140 and predictive contextual transaction scoring system 110 over communication network 120 using predefined network communication protocols such as wired protocols, wireless protocols (e.g., IEEE Std. 802.15.4, WiFi, Bluetooth, etc.), PLC protocols, or other shared-media protocols where appropriate. In this context, a protocol consists of a set of rules defining how devices or nodes interact with each other.

The predictive contextual transaction scoring system 110 includes one or more machine-readable instructions, and may comprise one or more servers connected via the communication network 120. In some example aspects, the predictive contextual transaction scoring system 110 can be a single computing device or in other embodiments, the predictive contextual transaction scoring system 110 can represent more than one computing device working together (e.g., in a cloud computing configuration).

Figure 2:
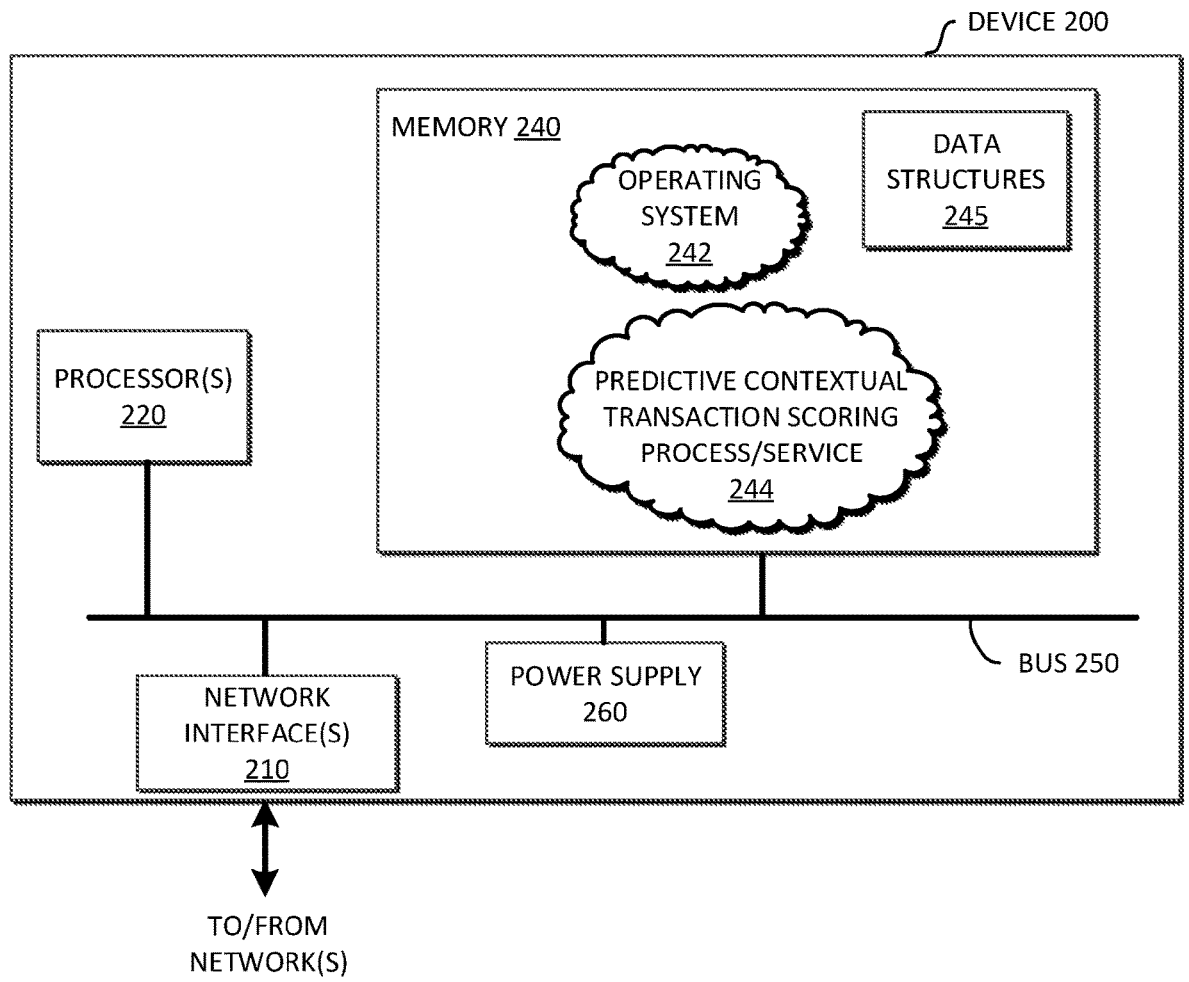
FIG. 2 illustrates a schematic diagram of an example predictive contextual transaction scoring device.

FIG. 2 is a schematic block diagram of an example node/device 200 that may be used with one or more embodiments described herein, e.g., as a component device of the predictive contextual transaction scoring system 110 shown in FIG. 1. Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 contain the mechanical, electrical, and signaling circuitry for communicating data over the communication links coupled to communication network 120. Network interfaces 210 may be configured to transmit and/or receive data using a variety of different communication protocols. Network interface 210 is shown for simplicity, and it is appreciated that such interface may represent two different types of network connections, e.g., wireless and wired/physical connections. Also, while network interface 210 is shown separately from power supply 260, for PLC the interface may communicate through power supply 260, or may be an integral component of the power supply. In some specific configurations the PLC signal may be coupled to the power line feeding into the power supply.

Memory 240 comprises a plurality of storage locations that are addressable by processor 220 and network interfaces 210 for storing software programs and data structures associated with the embodiments described herein. Note that certain devices may have limited memory or no memory (e.g., no memory for storage other than for programs/processes operating on the device and associated caches).

Processor 220 may comprise hardware elements or hardware logic adapted to execute the software programs (e.g., instructions) and manipulate data structures 245. An operating system 242, portions of which are typically resident in memory 240 and executed by the processor, functionally organizes the device 200 by, among other things, invoking operations in support of software processes and/or services executing on the device. These software processes and/or services may comprise predictive contextual transaction scoring process/services 244, as described herein. Note that while predictive contextual transaction scoring process/services 244 is shown in centralized memory 240, alternative embodiments provide for the process to be specifically operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In general, the term module or engine refers to model or an organization of interrelated software components/functions. Further, while the predictive contextual transaction scoring process 244 is shown as a standalone process, those skilled in the art will appreciate that this process may be executed as a routine or module within other processes.

As noted above, parties transacting on person-to-person marketplaces often leave feedback relating to their experiences on such marketplaces. While such feedback is intended to aid future transacting parties in assessing whether to proceed with a particular transaction, quite often there are situations where a particular preference or contextual characteristic of a transacting party may outweigh other factors relating to the transaction and cause the transacting party to leave the transaction feeling unimpressed or dissatisfied. For example, a customer who places a high priority on a clean vehicle for a ride, may be unsatisfied with a rideshare transaction where a vehicle may be dirty but otherwise arrives at their intended destination in a timely and safe manner. Unsatisfied parties to a transaction may then leave negative feedback or reviews, and may even stop using a marketplace or platform altogether. Existing marketplaces and platforms may implement certain matching algorithms to match a customer to a provider based on, for example, a location of a provider, distance from a provider to a customer, or other non-contextual parameters, but lack context-related parameters that may enable or facilitate a positive outcome to a transaction.

Accordingly, there is a need for a system that analyzes historical transaction review data to identify contextual characteristics of prior transactions to enable improved matching of a provider to a particular customer based on contextual characteristics and preferences of the transacting parties, as well as the contextual characteristics of a contemplated person-to-person transaction. The disclosed technology addresses the foregoing limitations of conventional systems by identifying contextual characteristics of parties and prior transactions from prior transaction review data, assigning the contextual characteristics to the transacting parties, and pairing transacting parties based in part on a match of contextual characteristics and preferences that are identified as notable or imperative to a party requesting a service or product. By considering certain contextual characteristics in pairing parties for a transaction, the system may further predict a transaction score for the contemplated pairing. Should the predicted transaction score exceed a baseline or not surpass a predetermined threshold, the contemplated pairing of the parties may be provided as a recommendation to the appropriate marketplace to facilitate the completion of the transaction.

These processes are embodied by a contextual transaction scoring system, which includes various systems, devices, and methods discussed herein. At a high level, the platform employs data processing and analysis of prior transaction review data to identify and catalog contextual characteristics of parties and prior transactions, analyzes new transaction requests to identify an identity and contextual characteristic associated with a party requesting a service or product, identifies potential of parties for a person-to-person transaction based on a match of contextual characteristics, and predicts a transaction score for the contemplated transaction to improve the likelihood that a particular transaction will result in satisfied parties on both sides of the transaction.

Figure 3:
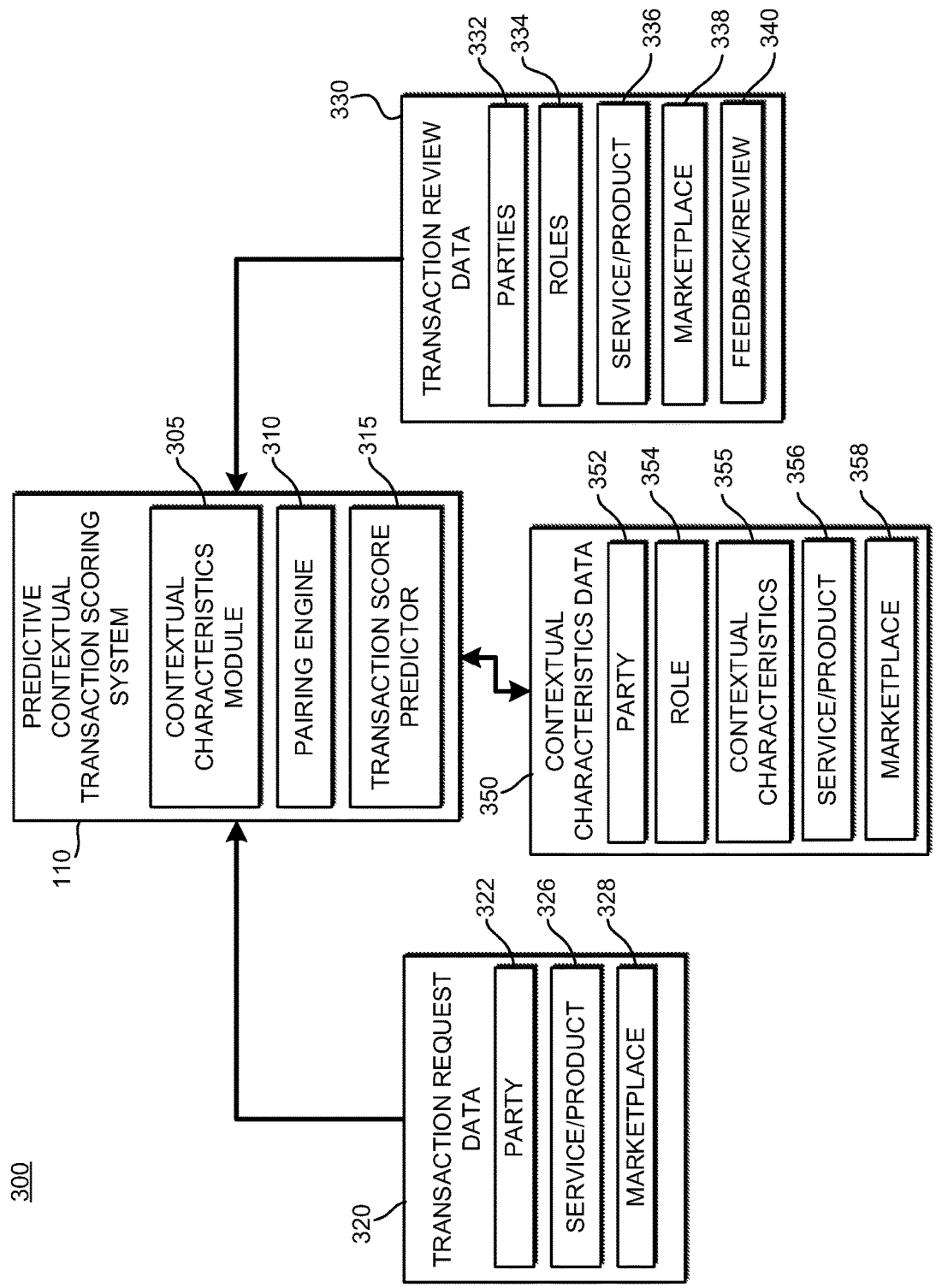
FIG. 3 illustrates a conceptual block diagram of the predictive contextual transaction scoring system shown in FIG. 1.

FIG. 3 illustrates a conceptual block diagram 300 of the predictive contextual transaction scoring system 110 shown in FIG. 1. As shown, predictive contextual transaction scoring system 110 includes one or more machine-readable instructions, such as a contextual characteristics module 305, a pairing engine 310, and a transaction score predictor 315. The predictive contextual transaction scoring system 110 includes at least one processor, a memory, and communications capability for receiving transaction request data 320 and transaction review data 330.

In operation, contextual characteristics module 305 receives transaction review data 330 from one or more marketplaces 130A-N over the communication network 120 (as shown in FIG. 1). The contextual characteristics module 305 may utilize APIs to receive the transaction review data 330. In one aspect, the transaction review data 330 may be received periodically or in real-time, as desired. Transaction review data 330 is associated with prior person-to-person transactions that occurred in one or more marketplaces 130A-N.

In one example, transaction review data 330 may include party identity data 332 of those engaged in prior person-to-person transactions (e.g., username, user identifier, email, social media accounts, etc.); role data 334 reflecting the roles of the parties engaged in prior person-to-person transactions (e.g., seller, provider, buyer, or consumer); service or product data 336 reflecting the product sold, service used, property leased, rented or purchased; marketplace data 338 identifying the particular marketplace 130A-N in which the prior person-to-person transaction occurred; feedback information 340 relating to the prior person-to-person transaction reflecting a review, rating or experience of the transacting parties, and may include transaction details such as the date, time, amount, and location of the prior person-to-person transaction. The feedback information 340 may comprise text, tags, or other data fields that enable searching and identifying of trends, characteristics, patterns, or subject to data analytics processing to identify contextual characteristics of the prior person-to-person transactions, as discussed further below. The transaction review data 330 may be encrypted or otherwise protected from exposure to protect sensitive information, such as names, addresses, and personal identifying information.

The contextual characteristics module 305 is configured to analyze the feedback information 340 related to the prior person-to-person transactions to identify contextual characteristics of the transacting parties and of the prior person-to-person transactions. Specifically, the contextual characteristics module 305 may conduct data analytics on the feedback information 340 to identify patterns or trends in the feedback information 340 that are indicative of a particular party's preference or priorities for certain contextual characteristics that may affect or impact the experience of that party in a future person-to-person transaction, and further identifies contextual characteristics that are associated with a particular type of transaction (e.g., rideshare transaction, home sharing transaction, secondary market purchase, etc.). The data analytics may involve application of text or tag searches, predictive analytics, artificial intelligence (AI) or machine learning algorithms to identify contextual characteristics of the transacting parties and of the prior person-to-person transactions.

For example, for a prior transaction involving a rideshare, a requestor's or rider's feedback information 340 may be analyzed to identify preferences or priorities for certain contextual characteristics associated with the rider, such as a rider's preference for a clean vehicle, safe driving, communication style (e.g., quiet or talkative), desire for amenities (e.g., free water, charging cable, etc.), route selection (e.g., knowledge of different routes, traffic patterns, shortcuts, over-reliance of navigation applications or GPS, etc.) and timeliness in trip duration. For the providers or drivers, the feedback information 340 may be analyzed to identify contextual characteristics that may be commonly attributed to the drivers, such as data indicating cleanliness of their car, safe driving, communication style (e.g., quiet of talkative), provision of amenities, knowledge of alternative routes, or timely arrival. As another example, for prior transactions involving vacation rentals, a requestor's or renter's feedback information 340 may be analyzed to identify preferences or priorities for certain contextual characteristics associated with the renter, such as a renter's dislike for inaccurate descriptions or pictures, preference of clean rentals, effort involved when vacating the property, quality of furnishings, timely return of security deposit, desire for personalization (e.g. catered or generic accommodations), local knowledge (e.g., concierge capabilities, recommendations to local attractions or activities) or appreciation for responsiveness. For the provider or landlord, the feedback information 340 may be analyzed to identify contextual characteristics that may be commonly attributed to the landlord, such as data indicating responsiveness, accuracy in describing the property, personalization of accommodations, or extensive knowledge of the local community.

The contextual characteristics module 305 may also analyze the feedback information 340 to identify prioritized contextual characteristics that may greatly affect or impact the outcome of a particular transaction. For example, analysis of the feedback information 340 may reveal a party's propensity to place cleanliness above safety for a rideshare transaction, or a party's propensity to place a sense of safety as the most paramount factor in determining whether the rideshare transaction results in a positive or negative experience for that party.

The contextual characteristics module 305 may also analyze the feedback information 340 to identify contextual characteristics of prior person-to-person transactions to determine which contextual characteristics appear relevant to a particular transaction or platform. For example, analysis of the feedback information 340 may reveal that for a rideshare transaction, contextual characteristics that appear relevant include safety, cleanliness, amenities, and timeliness. As another example, analysis of the feedback information 340 may reveal that for a vacation rental transaction, contextual characteristics that appear relevant include cleanliness, transparency, and personalization.

Once contextual characteristics and preferences for a particular party are identified by the contextual characteristics module 305, the contextual characteristics are assigned to each party to enable pairing by the pairing engine 310. In one example, the contextual characteristics may be assigned to the parties by using the party identity data 332 and role data 334 as an index. In another example, the contextual characteristics may be assigned to the parties based on identity data 332, role data 334, and marketplace data 338. In one aspect, the contextual characteristics may be stored in a database that is configured to be queried based on one or more fields provided by transaction request data 320, as discussed further below. For example, the contextual characteristics module 305 may generate contextual characteristics data 350 that includes the contextual characteristics and/or contextual preferences 355 identified for each party 352, and a corresponding marketplace 358 from which the contextual characteristics 355 were derived, as well as the role 354 that the party had in the prior person-to-person transaction. Other data structures or methodologies may be employed to assign the contextual characteristics to the parties as would be understood by a person of ordinary skill in the art.

The pairing engine 310 is configured to pair a party requesting a product or service in connection with a new person-to-person transaction, to a party providing the requested service or product by matching a contextual characteristic of the requesting party to a contextual characteristic of the providing party. By considering contextual characteristics that may be notable or of importance to the requesting party in finding a suitable provider, the likelihood that the transaction will leave the parties satisfied and content is greatly increased.

In operation, the pairing engine 310 receives transaction request data 320 reflecting a request for a new person-to-person transaction. The transaction request data 320 includes marketplace data 328 identifying the particular marketplace 130A-N in which the new person-to-person transaction request is generated; party identity data 322 identifying the requesting party (e.g., username, user identifier, email, social media accounts, etc.); service or product data 326 reflecting the product or service requested by the requesting party; and may further include transaction details such as the date, time, amount, and location of the request.

In one example, the marketplace for the new person-to-person transaction is identified from the marketplace data 328. Based on the identified marketplace, relevant or applicable contextual characteristics for the new person-to-person transaction are identified for use in a pairing operation. A search for the relevant contextual characteristics of the requesting party may then be conducted using the party identity data 322 from the transaction request data 320 to determine whether the requesting party has contextual characteristics that have been previously identified by the contextual characteristics module 305. In this example, the pairing engine 310 may search the contextual characteristics data 350 for the relevant or applicable contextual characteristics 355 of the requesting party by looking for a match between the party identity data 322 from the transaction request data 320 and the party identity data 352 in the contextual characteristics data 350. In another example, the contextual characteristics module 305 may search the party identity data 332 of the transaction review data 330 using the party identity data 322 from the transaction request data 320 to identify feedback information 340 corresponding to the requesting party. Once the feedback information 340 is found, the contextual characteristics module 305 may perform data analytics, as described above, to identify contextual characteristics from the feedback information 340 associated with the requesting party.

In one example, once the contextual characteristics 355 of the requesting party are identified, the pairing engine 310 may search the contextual characteristics data 350 for potential providers 352 by identifying parties who have roles 354 as providers of the product or service 356 requested by the requesting party, as may be identified from the service or product data 326, and who have transacted in the same marketplace 358 as identified in the marketplace data 328. In another example, the pairing engine 310 may search the transaction review data 330 for potential providers of the requested product or service by identifying parties 332 who have roles 334 as providers of the requested product or service by reviewing the service or product data 336 and marketplace data 338. In some aspects, the pairing engine 310 may first receive an initial list of provider candidates from the marketplace reflecting providers that may be currently offering the requested product or service. From this list of initial candidates, the pairing engine 310 may identify viable providers of the requested product or service to ensure that the resulting recommended pairing includes providers that are indeed available to offer the requested product or service.

Specifically, the pairing engine 310 may first query the marketplace data 338 of the transaction review data 330 to identify parties who have transacted in the same marketplace as the marketplace 328 identified in the transaction review data 330. Once potential parties are identified, the pairing engine 310 may further query the role data 334 of the transaction review data 330 to identify those parties who have had a role as a provider. Once these potential providers have been identified, the pairing engine 310 may further query the service or product data 336 of the transaction review data 330 to identify those parties who have previously provided similar goods or services as the product or service 326 identified in the transaction request data 320. Once the potential providers that have previously provided similar goods or services in the same marketplace are identified, the pairing engine may utilize the resulting party data 332 from the transaction review data 330 to query the party data 352 of the contextual characteristics data 350, to identify the corresponding relevant or applicable contextual characteristics 355 of the potential providers. Once the contextual characteristics 355 of the potential providers are identified, the pairing engine 310 may look for a match between the contextual characteristics 355 of the requesting party and the contextual characteristics 355 of the providing parties.

For example, should a requesting party be a rider requesting a rideshare, analysis of the rider's feedback information may reveal contextual characteristics reflecting that the rider values a clean vehicle and safe driving. The pairing engine 310 will search for drivers having contextual characteristics, derived from feedback information from prior person-to-person transactions, that indicates cleanliness and safe driving. By matching drivers with such attributes to preferences desired by the rider, it is more likely that both parties will complete the transaction satisfied and pleased, resulting in positive feedback and reviews for both the rider and driver.

The transaction score predictor 315 is configured to predict a "transaction score" resulting from the proposed pairing of the requesting party and the providing party. In other words, the "transaction score" represents a predicted feedback, grade or review that is expected from the requesting party 322 as a result of the contemplated transaction with the providing party. In one aspect, the predicted transaction score may be based on a multitude of contextual characteristics and preferences 355 of the transacting parties, such as a party's propensity to provide more positive reviews in certain times of the day, certain days of the week, for short trips versus longer trips, for services consumed locally versus away from home, for rides provided in higher-end luxury vehicles, or other contextual factors that may be derived from analyzing the feedback information of the parties. The transaction score is thus dynamic in that it may change based on the particular contextual characteristics of the parties involved, as well as contextual characteristics of the transaction itself (e.g., time of day, duration of service, location of service, cost of service, etc). For example, the predicted transaction score may change based on the time of day, type of transaction, a party's role in the transaction, and/or preferences of the transacting party.

The predicted transaction score may be used to determine whether another pairing should be recommended where the initial predicted transaction score is lower than an acceptable value or threshold. For example, should a particular marketplace require a predicted transaction score of 4 out of 5 (in a 5 star scale), and a first proposed pairing results in a 3-star predicted score based on the fact that the requesting party tends to score lower in the early mornings when riding in a small vehicle, the pairing engine 310 may recommend a different pairing with a provider offering a larger vehicle (e.g., SUV). The transaction score predictor 315 may then generate a predicted transaction score with the larger vehicle as a contextual consideration that may result in a higher transaction score of 4-stars. In this example, the pairing with the second provider having the larger vehicle is more desirable as there is a higher likelihood that the parties involved in the contemplated person-to-person transaction will be satisfied and pleased with the transaction.

Once a suggested pairing results in an acceptable predicted transaction score, the recommended pairing may be conveyed or provided to the marketplace 328 identified in the transaction request data 320 to facilitate pairing of the requesting party 322 with the recommended providing party.

FIG. 4 illustrates exemplary data mapping of the contextual characteristics data 350. In particular, the contextual characteristics data 350 data is mapped to the parties 352 so that for each party 352, contextual characteristics and preferences 355 and priorities 430 are identified, along with the party's respective role 354 in the prior person-to-person transactions, the services and/or products 356 consumed or provided by the party, and the marketplaces 358 in which the party has consummated prior person-to-person transactions.

For example, as shown in FIG. 4, a first party 352A has contextual characteristics 355 of safety 421 as their highest priority 430, cleanliness 422 as their second highest priority 430, and timeliness 423 as their third highest priority. The first party has a role 354 of rider and has previously consumed rideshare services 356 on a rideshare platform 358. Upon a request for a new rideshare transaction on the same rideshare platform or a similar alternative, the pairing engine 310 (as shown in FIG. 3) searches the contextual characteristics data 350 for a pairing party. The pairing engine 310 may first search for parties that have previously transacted on the same or similar rideshare platform. Here, parties 352B and 352D have previously transacted on the rideshare platform 358. Next, the pairing engine 310 may search for parties who are drivers 354 to identify potential candidates for pairing with the first party 352A. Again, the second party 352B and fourth party 352D remain viable candidates for pairing. The third party 352C is not a candidate because third party 352C has no history of transacting in any rideshare platform, having instead transacted on a rental platform 358 as a host 354 in providing a short-term rental.

The pairing engine 310 may then search the contextual characteristics 355 of the second party 352B and the fourth party 352D to determine whether there is a match with the contextual characteristics of the first party 352A. Here, the first party 352A places safety 421 as the most important contextual characteristic thereby resulting in the second party 352B, who while perhaps friendly 425, is a poor candidate due to the second party's propensity to drive above the speed limit 424. In looking at the contextual characteristics 355 of the fourth party 352D, there is a match in that the fourth party 352D has been identified as a driver with a high safety 421 rating or ranking. While the fourth party 352D may be inexperienced 426, the contextual characteristics of the first party 352A do not indicate that experience is a contextual characteristic 355 that may negatively impact a rating of a person-to-person transaction involving inexperienced service providers.

FIG. 5 illustrates an example process diagram 500 for predicting a contextual transaction score. It should be understood that, for any process discussed herein, there can be additional, fewer, or alternative steps performed in similar or alternative orders, or in parallel, within the scope of the various aspects unless otherwise stated. The process 500 can be performed by the network environment 100 utilizing a predictive contextual transaction scoring system 110.

At step 502, transaction review data including feedback information relating to prior person-to-person transactions is received from one or more marketplaces. The transaction review data may also include the identity of parties involved in the prior person-to-person transactions, and a role of the parties in the prior person-to-person transactions. At step 504, contextual characteristics are identified by analyzing the feedback information related to the prior person-to-person transactions. At step 506, the identified contextual characteristics and preferences are assigned to the corresponding parties in the prior person-to-person transactions. At step 508, a request for a new person-to-person transaction request is received. The new transaction request may include information identifying the requesting party. At step 510, the requesting party and the contextual characteristics attributable to the requesting party are identified. In one example, the transaction review data may be queried by using the identity information of the requesting party.

At step 512, a search for potential candidates to pair with the requesting party is performed. In one aspect, the search may consider the prior roles and services or goods offered by the candidates. At step 514, it is determined whether there is a match between the contextual characteristics of the requesting party and the contextual characteristics of a potential providing party. If there is no match, then a search for additional candidates is conducted. If there is a match, then at step 516, the requesting party and the providing party are paired. In some aspects, pairing of parties may require matching of more than one contextual characteristics. At step 518, a transaction score is predicted for the contemplated new person-to-person transaction involving the requesting party and the providing party. The predicted transaction score represents predicted feedback for the new person-to-person transaction and is generated based on a match of at least one contextual characteristic of the first party to the second party.

At step 520, it is determined whether the predicted transaction score exceeds a predetermined threshold. If not, then a new candidate search is conducted at step 512. In this case, the requesting party would be paired with a different party providing the requested service by matching one or more contextual characteristics of the requesting party to the contextual characteristics of the different party. If there was a match between the contextual characteristics of the requesting party and the different party, then a second transaction score would be predicted for the contemplated transaction involving the requesting party and the different party. If the predicted transaction score exceeds the predetermined threshold or is otherwise acceptable, then at step 522, the recommended pairing is provided to the marketplace to facilitate pairing of the requesting party to the recommended providing party.

Figure 6:
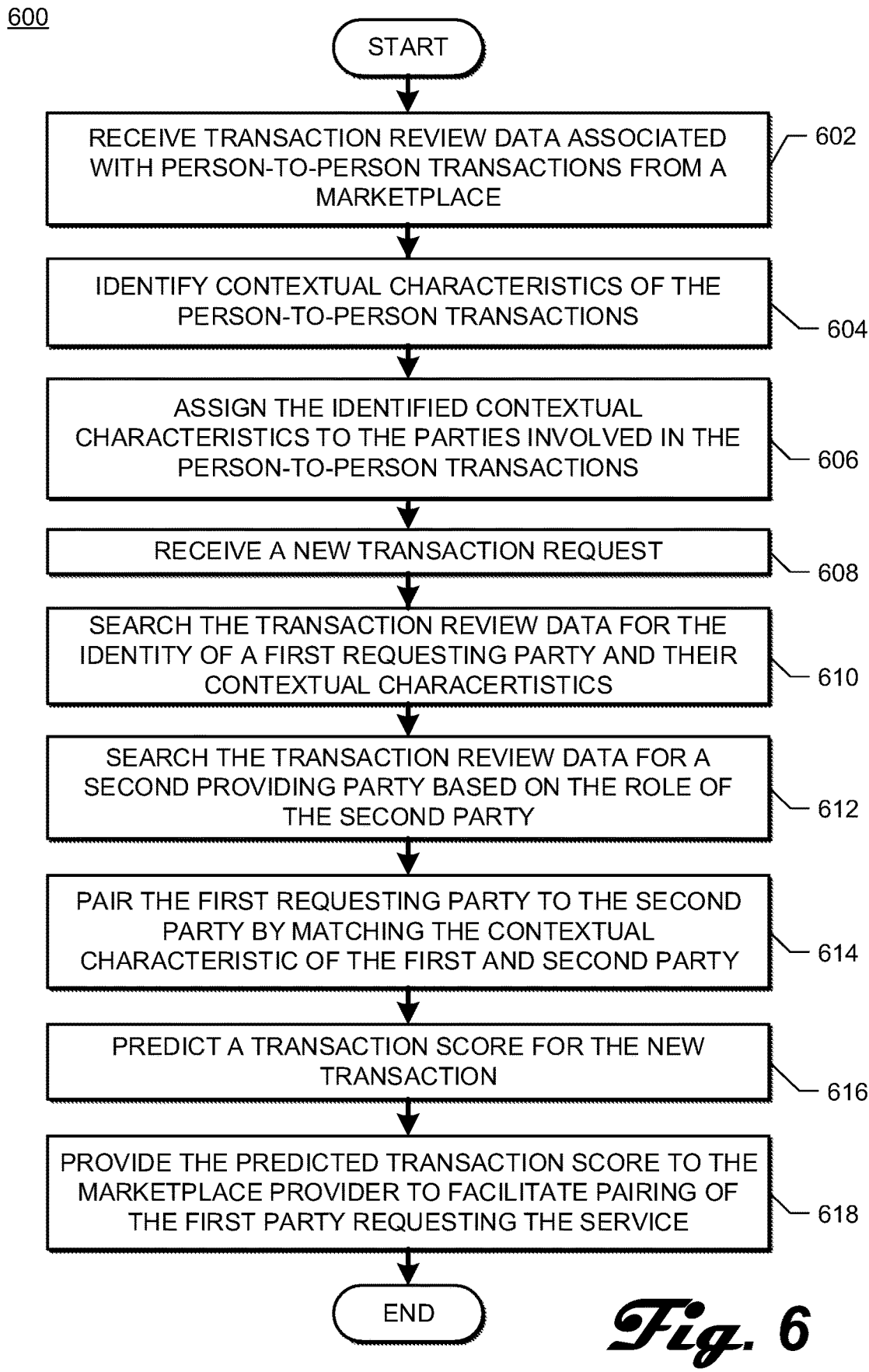
FIG. 6 illustrates a method for predicting a contextual transaction score.

FIG. 6 illustrates a method 600 for predicting a contextual transaction score in accordance with the processes described above. For purposes of discussion, the operations for procedure 600 are described in the context of the predictive contextual transaction scoring system 110 or simply the "system." As described above, the system identifies contextual characteristics of transacting parties to recommend a pairing and generates a predicted transaction score in order to increase the likelihood that the recommended pairing will result in a positive transaction experience for all parties involved in a new contemplated person-to-person transaction.

The procedure 600 begins at step 602, where, as described in greater detail above, the system receives transaction review data associated with prior person-to-person transactions from one or more marketplaces. The transaction review data includes feedback information relating to the prior person-to-person transactions, and may further include an identity of parties involved in the prior person-to-person transactions, and a role of the parties in the prior person-to-person transactions.

Procedure continues to step 604, where the system identifies contextual characteristics of the prior person-to-person transactions by analyzing the feedback information related to the prior person-to-person transactions. Specifically, data analytics may be performed on the feedback information to identify patterns or trends in the feedback information that are indicative of a particular party's preference or priorities for certain contextual characteristics that may affect or impact the experience of that party in a future person-to-person transaction, and further identifies contextual characteristics that are associated with a particular type of transaction (e.g., rideshare transaction, home sharing transaction, secondary market purchase, etc.). The data analytics may involve application of text or tag searches, predictive analytics, artificial intelligence (AI) or machine learning algorithms to identify contextual characteristics of the transacting parties and of the prior person-to-person transactions.

At step 606, the identified contextual characteristics and preferences are assigned to the parties involved in the person-to-person transactions. In one example, the contextual characteristics and preferences may be assigned to the parties by using an index. In one aspect, the contextual characteristics and preferences may be stored in a database that is configured to be queried based on one or more fields. At step 608, a request for a new person-to-person transaction is received. The new person-to-person request may include an identity of a first requesting party, the requested service or goods, and the originating marketplace. At step 610, the transaction review data may be searched for the identity of the first requesting party. Once identified, the contextual characteristics of the first requesting party may be identified. At step 612, a search for a second providing party is performed on the transaction review data based on the role of the second providing party. In some aspects, an initial list of provider candidates may be received from the originating marketplace reflecting providers that may be currently offering the requested product or service. From this list of initial candidates, viable providers of the requested product or service may be identified to ensure that the resulting recommended pairing includes providers that are indeed available to offer the requested product or service.

At step 614, the first requesting party is paired to the second party providing the requested service by matching one or more contextual characteristics of the first requesting party to a contextual characteristics of the second party, as well as considering the priorities of such matching contextual preferences and characteristics. At step 616, a transaction score is predicted for the new person-to-person transaction involving the first party and the second party. The predicted transaction score represents a predicted feedback for the new person-to-person transaction and is generated based on the matched contextual characteristics of the first party to the second party. Should a predicted transaction score fall below an acceptable level or threshold, the first party requesting the service may be paired to a third party providing the requested service by matching one or more contextual characteristics of the first party to the contextual characteristics of the third party, as well as by considering the priorities of such matching contextual characteristics. A second predicted transaction score for the contemplated new person-to-person transaction involving the first party and the third party is generated, the second predicted transaction score representing predicted feedback for the contemplated new person-to-person transaction and generated based on the matching contextual characteristics of the first party and the third party.

Procedure 600 subsequently ends at step 618, where the predicted transaction score is provided to the marketplace to facilitate pairing of the first party requesting the service, but may continue on to step 602 where, as discussed above, system receives transaction review data associated with prior person-to-person transactions from one or more marketplaces, or at step 608 where a request for a new person-to-person transaction is received. It should be noted that certain steps within procedure 600 may be optional, and further, the steps shown in FIG. 6 are merely examples for illustration—certain other steps may be included or excluded as desired. Further, while a particular order of the steps is shown, this ordering is merely illustrative and any suitable arrangement of the steps may be utilized without departing from the scope of the embodiments herein.

The techniques described herein, therefore, describe identification of contextual preferences and characteristics of transacting parties to recommend a pairing and generation of a predicted transaction score in order to increase the likelihood that the recommended pairing will result in a positive transaction experience for all parties involved in any newly contemplated person-to-person transaction. The processes and methods described herein analyze prior feedback information to identify contextual characteristics that may impact an outcome of a person-to-person transaction.

While there have been shown and described illustrative embodiments of a predictive contextual transaction scoring system, it is to be understood that various other adaptations and modifications may be made within the spirit and scope of the embodiments herein. For example, the embodiments have been shown and described herein with relation to a specific system that organizes certain functions into modules or engines. However, the embodiments in their broader sense are not as limited, and may, in fact, be used with any number of applications, devices, and systems as part of a distributed computing network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A predictive contextual transaction scoring system, comprising:
   one or more network interfaces to communicate over a network;
   a processor coupled to the network interfaces and adapted to execute one or more processes; and
   a memory having instructions executable by the processor encoded thereon, the instructions, when executed by the processor, are operable to:
     receive contextual feedback data for historical transactions associated with a marketplace, the contextual feedback data including contextual transaction details associated with respective completed transactions;
     analyze patterns in the contextual feedback data to identify unique preferences associated with a requesting party;
     analyze the contextual feedback data to identify attributes associated with each respective service provider of first set of service providers;
     receive a service request from the requesting party for a new transaction in the marketplace;
     predict a feedback score for completing the service request by each respective service provider of a second set of service providers based on a match between the attributes of each respective service provider and the unique preferences of the requesting party;
     determine the feedback score for at least one service provider of the second set of service providers exceeds a baseline transaction score for the marketplace; and
     provide a recommendation to the requesting party to facilitate the new transaction in the marketplace between the requesting party and the at least one service provider.

2. The system of claim 1, wherein the contextual transaction details associated with completed individual transactions include a time of day, a duration of service, a location of service, and a cost of service.

3. The system of claim 1, wherein the instructions to determine the feedback score for the at least one service provider exceeds the baseline transaction score are further operable to determine the feedback score for the at least one service provider exceeds a threshold transaction score.

4. The system of claim 1, wherein the instructions are further operable to:
   assign one or more potential service providers to the second set of service providers based on a respective availability to perform the service request.

5. The system of claim 1, wherein the service request is associated with a transaction type, wherein the unique preferences associated with the requesting party comprise relevant unique preferences for the transaction type, wherein the instructions to analyze patterns in the contextual feedback are further operable to:
   determine a propensity for each relevant preference to affect the outcome of the service request; and
   prioritize the relevant unique preferences based on the propensity.

6. A computer implemented method for predicting a contextual transaction score, the method comprising:

receiving contextual feedback data for historical transactions associated with a marketplace, the contextual feedback data including contextual transaction details associated with respective completed transactions;

analyzing patterns in the contextual feedback data to identify unique preferences associated with a requesting party;

analyzing the contextual feedback data to identify attributes associated with each respective service provider of first set of service providers;

receiving a service request from the requesting party for a new transaction in the marketplace;

predicting a feedback score for completing the service request by each respective service provider of a second set of service providers based on a match between the attributes of each respective service provider and the unique preferences of the requesting party;

determining the feedback score for at least one service provider of the second set of service providers exceeds a baseline transaction score for the marketplace; and providing a recommendation to the requesting party to facilitate the new transaction in the marketplace between the requesting party and the at least one service provider.

7. The computer implemented method of claim 6, wherein the contextual transaction details associated with completed individual transactions include a time of day, a duration of service, a location of service, and a cost of service.

8. The computer implemented method of claim 6, wherein determining the feedback score for the at least one service provider exceeds the baseline transaction score further comprises determining the feedback score for the at least one service provider exceeds a threshold transaction score.

9. The computer implemented method of claim 6, further comprising:
assigning one or more potential service providers to the second set of service providers based on a respective availability to perform the service request.

10. The computer implemented method of claim 6, wherein the service request is associated with a transaction type, wherein the unique preferences associated with the requesting party comprise relevant unique preferences for the transaction type, wherein analyzing patterns in the contextual feedback further comprise:
determining a propensity for each relevant preference to affect the outcome of the service request; and
prioritizing the relevant unique preferences based on the propensity.

11. A tangible, non-transitory, computer-readable media having instructions encoded thereon, the instructions, when executed by a process, is operable to:
receive contextual feedback data for historical transactions associated with a marketplace, the contextual feedback data including contextual transaction details associated with respective completed transactions;

analyze patterns in the contextual feedback data to identify unique preferences associated with a requesting party;

analyze the contextual feedback data to identify attributes associated with each respective service provider of first set of service providers;

receive a service request from the requesting party for a new transaction in the marketplace;

predict a feedback score for completing the service request by each respective service provider of a second set of service providers based on a match between the attributes of each respective service provider and the unique preferences of the requesting party;

determine the feedback score for at least one service provider of the second set of service providers exceeds a baseline transaction score for the marketplace; and provide a recommendation to the requesting party to facilitate the new transaction in the marketplace between the requesting party and the at least one service provider.

12. The tangible, non-transitory, computer-readable media of claim 11, wherein the contextual transaction details associated with completed individual transactions include a time of day, a duration of service, a location of service, and a cost of service.

13. The tangible, non-transitory, computer-readable media of claim 11, wherein the instructions to determine the feedback score for the at least one service provider exceeds the baseline transaction score are further operable to determine the feedback score for the at least one service provider exceeds a threshold transaction score.

14. The tangible, non-transitory, computer-readable media of claim 11, wherein the instructions are further operable to:
assign one or more potential service providers to the second set of service providers based on a respective availability to perform the service request.

* * * * *